United States Patent
Shiau

(10) Patent No.: US 7,678,499 B2
(45) Date of Patent: *Mar. 16, 2010

(54) SHORT-CIRCUIT FREE BATTERY RECEPTACLE

(76) Inventor: Wen-Chin Shiau, No. 10, Alley 1, Lane 551, Sec. 1, Wan-Shou Rd., Kuei-Shan Hsiang, Tao-Yuan Hsien (TW)

( * ) Notice: Subject to any disclaimer, the term of this patent is extended or adjusted under 35 U.S.C. 154(b) by 1170 days.

This patent is subject to a terminal disclaimer.

(21) Appl. No.: 11/261,650

(22) Filed: Oct. 31, 2005

(65) Prior Publication Data

US 2006/0210871 A1 Sep. 21, 2006

(30) Foreign Application Priority Data

Mar. 15, 2005 (TW) ............................ 94203972 U
Jul. 22, 2005 (TW) ............................ 94212442 U

(51) Int. Cl.
 *H01M 2/02* (2006.01)
 *H01M 2/00* (2006.01)
 *H01M 2/08* (2006.01)

(52) U.S. Cl. .................... 429/167; 429/163; 429/164; 429/180

(58) Field of Classification Search .............. 429/163, 429/165, 164, 167, 180
See application file for complete search history.

(56) References Cited

U.S. PATENT DOCUMENTS

| 3,864,171 | A | * | 2/1975 | Mills et al. | ............... | 429/27 |
| 5,663,013 | A | * | 9/1997 | Narukawa et al. | ........... | 429/164 |
| 6,207,321 | B1 | * | 3/2001 | Fukagawa et al. | ........... | 429/176 |
| 2008/0166629 | A1 | * | 7/2008 | Shiau | ........................ | 429/169 |

* cited by examiner

*Primary Examiner*—Patrick Ryan
*Assistant Examiner*—Julian Mercado
(74) *Attorney, Agent, or Firm*—Merek, Blackmon & Voorhees, LLC

(57) ABSTRACT

A battery receptacle includes an insulative casing, positive and negative electrodes, and an interface assembly. The positive and negative electrodes have end portions disposed on the casing. The negative electrode has an end portion disposed on the casing. The interface assembly is disposed on the casing, and includes an insulative body, anode and cathode terminals, a contact element, and an insulating protrusion. The anode terminal projects from the insulative body, and is in electrical contact with the end portion of the positive electrode. The cathode terminal is provided on a periphery of the insulative body. The contact element is in electrical contact with the cathode terminal, projects from the insulative body, and is in electrical contact with the end portion of the negative electrode. The insulating protrusion is provided on the insulative body, and abuts against the end portion of the positive electrode.

14 Claims, 4 Drawing Sheets

SHORT-CIRCUIT FREE BATTERY RECEPTACLE

CROSS-REFERENCE TO RELATED APPLICATION

This application claims priority of Taiwanese Application No. 094203972, filed on Mar. 15, 2005, and Taiwanese Application No. 094212442, filed on Jul. 22, 2005.

BACKGROUND OF THE INVENTION

1. Field of the Invention

This invention relates to a battery receptacle, more particularly to a battery receptacle that is short circuit proof.

2. Description of the Related Art

FIG. 1 illustrates a conventional battery receptacle 1 that includes an insulative casing 2, a positive electrode 25, a negative electrode 26, and an interface assembly 3.

The casing 2 includes top and bottom walls 21, 22 that define an accommodating space 20 therebetween for accommodating battery cells 100.

With further reference to FIG. 2, the positive electrode 25 has a first end portion 251 that extends into the accommodating space 20 in the casing 2 and that is in electrical contact with a positive terminal of one of the battery cells 100, and a second end portion 252 that is disposed externally of the accommodating space 20 and that abuts against the top wall 21 of the casing 2. The negative electrode 26 has a first end portion 261 that extends into the accommodating space 20 in the casing 2 and that is connected electrically to a negative terminal of one of the battery cells 100, and a second end portion 262 that is disposed externally of the accommodating space 20 and that abuts against the top wall 21 of the casing 2.

The top wall 21 of the casing 2 is formed with first and second grooves 210, 210'. The second end portion 252 of the positive electrode 25 is disposed in the second groove 210' in the top wall 21 of the casing 2, whereas the second end portion 262 of the negative electrode 26 is disposed in the first groove 210 in the top wall 21 of the casing 2.

The interface assembly 3 includes an insulative body 30, and anode and cathode terminals 31, 32. The insulative body 30 has top and bottom surfaces, and a peripheral surface that interconnects the top and bottom surfaces of the insulative body 30. The anode terminal 31 is disposed at a center of the insulative body 30, and has a first end portion 311 that projects from the top surface of the insulative body 30, and a second end portion 312 that projects from the bottom surface of the insulative body 30. The cathode terminal 32 is provided on the peripheral surface of the insulative body 30.

When the interface assembly 3 is disposed on the top wall 21 of the casing 2, the second end portion 312 of the anode terminal 31 is in electrical contact with the second end portion 252 of the positive electrode 25, and the cathode terminal 32 is in electrical contact with the second end portion 262 of the negative electrode 26.

With further reference to FIG. 3, the battery receptacle 1 further includes five electrical contacts 24 for connecting the battery cells 100 in series. Three of the electrical contacts 24 are provided on the bottom wall 22 of the casing 2, whereas two of the electrical contacts 24 are provided on the top wall 21 of the casing 2. The battery receptacle 1 is provided with a plurality of grooves 240, two of which are formed in the top wall 21 of the casing 2 and three of which are formed in the bottom wall 22 of the casing 2. Each of the grooves 240 is defined by a groove-defining wall 241. Each of the electrical contacts 24 has a portion that is disposed in a respective one of the grooves 240 and that engages a respective one of the groove-defining walls 241.

The aforementioned conventional battery receptacle 1 is disadvantageous in that, when it is subjected to shock during use, the cathode terminal 32 may intermittently lose its electrical contact with the second end portion 262 of the negative electrode 26. Moreover, in severe instances, the shock may cause a short circuit between the cathode terminal 32 and the second end portion 252 of the positive electrode 25. Further, the insertion of the electrical contacts 24 in the grooves 240 during assembly requires much effort.

SUMMARY OF THE INVENTION

Therefore, the object of the present invention is to provide a battery receptacle that does not suffer from short circuit even when subjected to shock.

According to the present invention, a battery receptacle comprises an insulative casing, a positive electrode, a negative electrode, and an interface assembly. The insulative casing includes top and bottom walls that cooperate to define an accommodating space therebetween for accommodating a battery unit. The positive electrode has a first end portion that extends into the accommodating space and that is adapted to contact electrically the battery unit, and a second end portion that is disposed externally of the accommodating space and that abuts against the top wall of the casing. The negative electrode has a first end portion that extends into the accommodating space and that is adapted to be connected electrically to the battery unit, and a second end portion that is disposed externally of the accommodating space and that abuts against the top wall of the casing. The interface assembly is disposed on the top wall of the casing, and includes an insulative body, an anode terminal, a cathode terminal, a contact element, and an insulating protrusion. The insulative body has top and bottom surfaces, and a peripheral surface that interconnects the top and bottom surfaces. The anode terminal has a first end portion that extends through the insulative body and that projects from the top surface of the insulative body, and a second end portion that projects from the bottom surface of the insulative body and that is in electrical contact with the second end portion of the positive electrode. The cathode terminal is provided on the peripheral surface of the insulative body. The contact element has a first end portion that extends through the insulative body and that is in electrical contact with the cathode terminal, and a second end portion that projects from the bottom surface of the insulative body and that is in electrical contact with the second end portion of the negative electrode. The insulating protrusion is provided on the bottom surface of the insulative body, and abuts against the second end portion of the positive electrode. Accordingly, a gap is maintained between the cathode terminal and the second end portion of the positive electrode.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
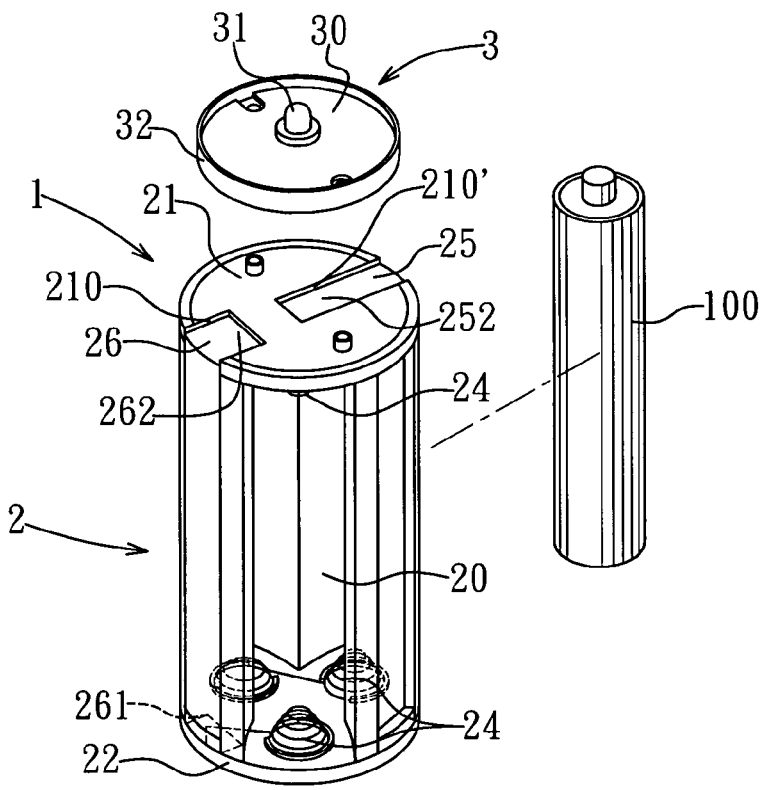
FIG. 1 is a partly exploded, perspective view of a conventional battery receptacle.
Figure 2:
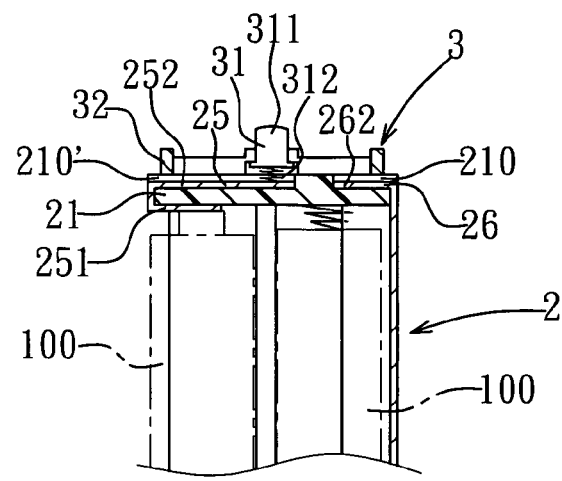
FIG. 2 is a fragmentary schematic partly sectional view of the conventional battery receptacle to illustrate an assembled state of the same.
Figure 3:
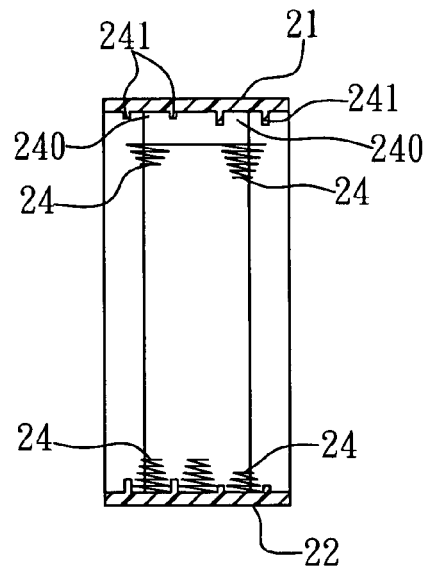
FIG. 3 is a schematic partly sectional view to illustrate how electrical contacts are assembled to an insulative casing of the conventional battery receptacle.
Figure 4:
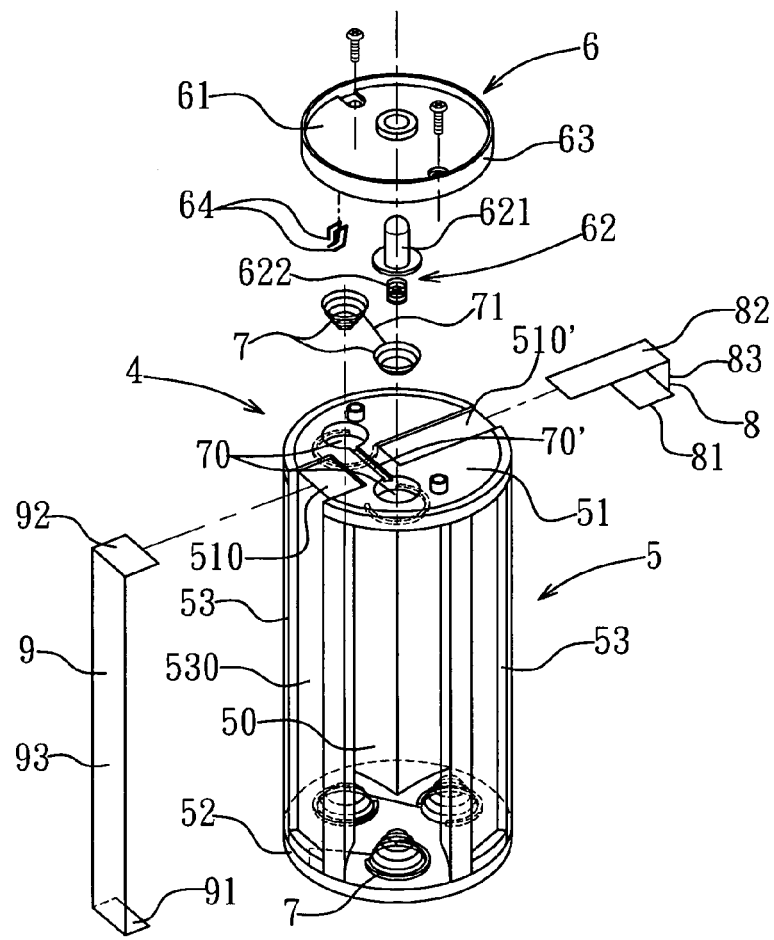
FIG. 4 is an exploded perspective view of the preferred embodiment of a battery receptacle according to the present invention.
Figure 5:
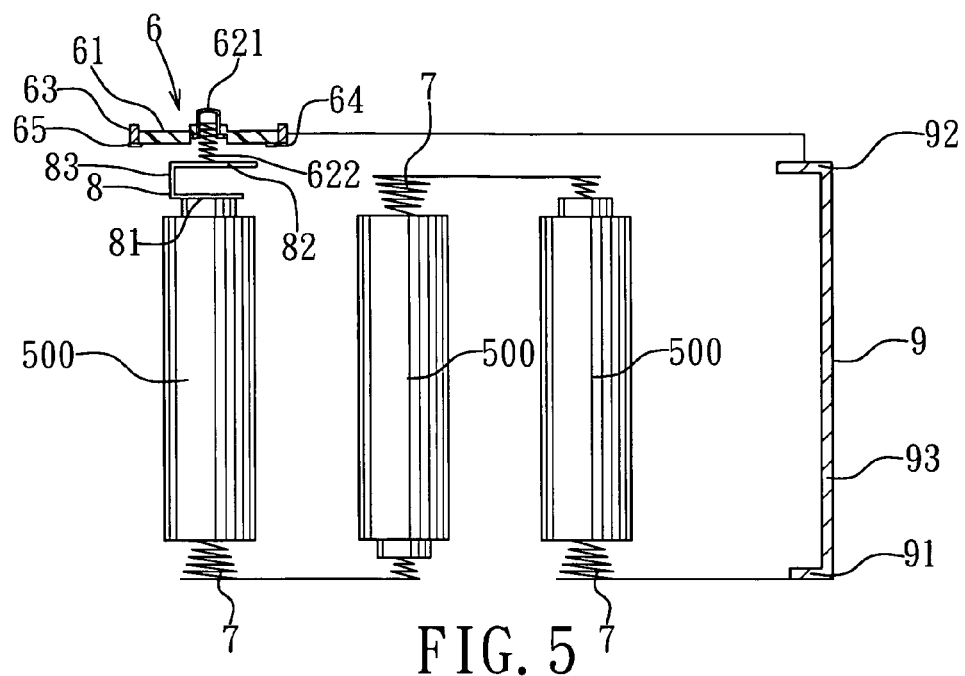
FIG. 5 is a schematic partly sectional view to illustrate how battery cells are connected in series through electrical contacts of the preferred embodiment.

Referring to FIGS. 4 and 5, the preferred embodiment of a battery receptacle 4 according to this invention is shown to include an insulative casing 5, a positive electrode 8, a negative electrode 9, and an interface assembly 6.

The insulative casing 5 includes top and bottom walls 51, 52, and a lateral wall 53 that interconnects the top and bottom walls 51, 52 of the casing 5. The top and bottom walls 51, 52 of the casing 5 cooperate to define an accommodating space 50 therebetween for accommodating a battery unit. In this embodiment, the battery unit includes three battery cells 500.

The top wall 51 of the casing 5 has opposite interior and exterior surfaces, and a peripheral surface that interconnects the interior and exterior surfaces of the top wall 51 of the casing 5.

The positive electrode 8 is generally U-shaped, and has first and second end portions 81, 82, and an intermediate portion 83 that interconnects the first and second end portions 81, 82 of the positive electrode 8. The first end portion 81 of the positive electrode 8 extends into the accommodating space 50, abuts against the interior surface of the top wall 51 of the casing 5, and is adapted to contact electrically a positive terminal of one of the battery cells 500 of the battery unit. The second end portion 82 of the positive electrode 8 is disposed externally of the accommodating space 50, and abuts against the exterior surface of the top wall 51 of the casing 5. The intermediate portion 83 of the positive electrode 8 abuts against the peripheral surface of the top wall 51 of the casing 5.

The negative electrode 9 has first and second end portions 91, 92, and an intermediate portion 93 that interconnects the first and second end portions 91, 92 of the negative electrode 9. The first end portion 91 of the negative electrode 9 extends into the accommodating space 50 through the lateral wall 53 of the casing 5, abuts against an interior surface of the bottom wall 52 of the casing 5, and is connected electrically to a negative terminal of one of the battery cells 500 of the battery unit. The second end portion 92 of the negative electrode 9 is disposed externally of the accommodating space 50, and abuts against the exterior surface of the top wall 51 of the casing 5. The intermediate portion 93 of the negative electrode 9 abuts against an exterior surface of the lateral wall 53 of the casing 5.

The exterior surface of the top wall 51 of the casing is formed with first and second grooves 510, 510'. The second end portion 82 of the positive electrode 8 is disposed in the second groove 510' in the exterior surface of the top wall 51 of the casing 5, whereas the second end portion 92 of the negative electrode 9 is disposed in the first groove 510 in the exterior surface of the top wall 51 of the casing 5. In addition, the exterior surface of the lateral wall 53 of the casing 5 is formed with a groove 530. The intermediate portion 93 of the negative electrode 9 is disposed in the groove 530 in the exterior surface of the lateral wall 53 of the casing 5.

The battery receptacle 4 further includes five electrical contacts 7 for connecting the battery cells 500 of the battery unit in series, in a manner well known in the art. Three of the electrical contacts 7 are provided on the bottom wall 52 of the casing 5, whereas two of the electrical contacts 7 are provided on the top wall 51 of the casing 5. The two electrical contacts 7 on the top wall 51 of the casing 5 are interconnected by a conductive strip 71.

Figure 6:
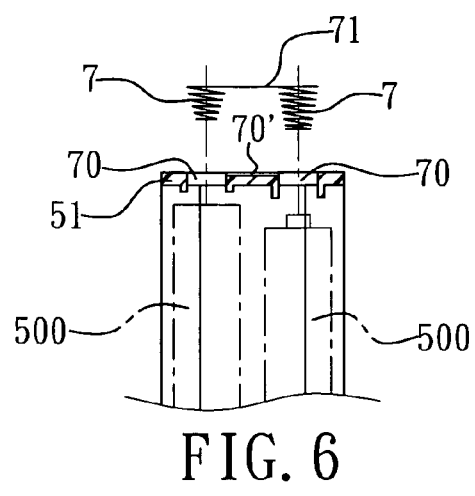
FIG. 6 is a fragmentary schematic partly sectional view to illustrate how electrical contacts are assembled to in insulative casing of the preferred embodiment.

With further reference to FIG. 6, the top wall 51 of the casing 5 is further formed with a pair of holes 70 therethrough, and a third groove 70' that interconnects the holes 70. Each of the two electrical contacts 7 is provided on the top wall 51 of the casing 5 such that a first end portion of each of the electrical contacts 7 is disposed in a respective one of the holes 70 in the top wall 51 of the casing 5, such that a second end portion of each of the electrical contacts 7 extends into the accommodating space 50 in the casing 5, and such that the conductive strip 71 is disposed in the third groove 70' in the top wall 51 of the casing 5. The construction as such simplifies assembling of the electrical contacts 7 on the top wall 51 of the casing 5. In this embodiment, each of the electrical contacts 7 is in the form of a spiral spring.

Figure 7:
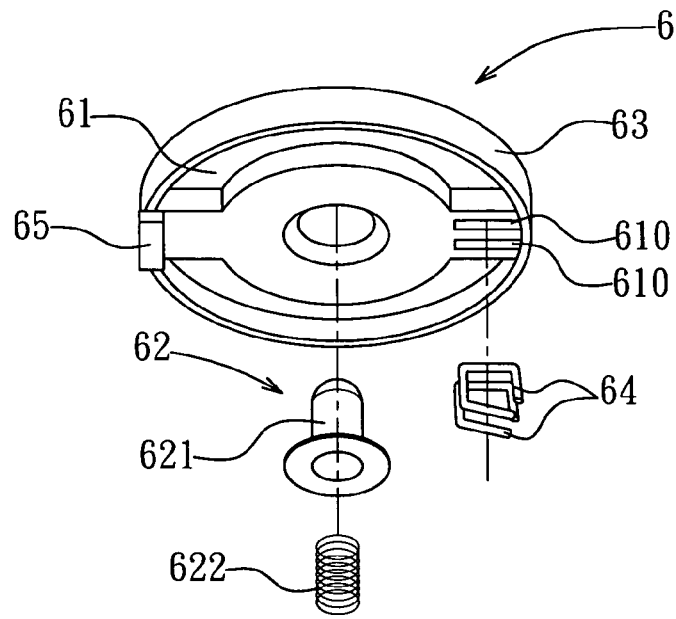
FIG. 7 is an exploded perspective view of an interface assembly of the preferred embodiment.

With further reference to FIG. 7, the interface assembly 6 includes an insulative body 61, an anode terminal 62, a cathode terminal 63, a pair of contact elements 64, and an insulating protrusion 65.

The insulative body 61 is generally circular in shape, and has top and bottom surfaces and a peripheral surface that interconnects the top and bottom surfaces of the insulative body 61.

The anode terminal 62 is disposed at a center of the insulative body 61, and includes a hollow cap-shaped terminal part 621 and a resilient terminal part 622. The cap-shaped terminal part 621 of the anode terminal 62 extends through the insulative body 61 and projects from the top surface of the insulative body 61. The resilient terminal part 622 has a first end portion that is disposed in and that abuts against the cap-shaped terminal part 621, and a second end portion that projects from the bottom surface of the insulative body 61. In this embodiment, the resilient terminal part 622 of the anode terminal 62 is in the form of a compression spring.

The cathode terminal 63 is annular and is provided on the peripheral surface of the insulative body 61.

The insulative body 61 is formed with a pair of through holes 610, each of which extends between the bottom surface and the peripheral surface of the insulative body 61. Each of the contact elements 64 is configured with three bends to form a substantially rectangular shape, thereby permitting the contact elements 64 to be inherently resilient. In this embodiment, each of the contact elements 64 has a first end portion that extends through a respective one of the through holes 610 in the insulative body 610 and that is in electrical contact with the cathode terminal 63, and a second end portion that projects from the bottom surface of the insulative body 61.

The insulating protrusion 65 is provided on the bottom surface of the insulative body 61. In this embodiment, the insulating protrusion 65 is formed integrally with the insulative body 61.

Figure 8:
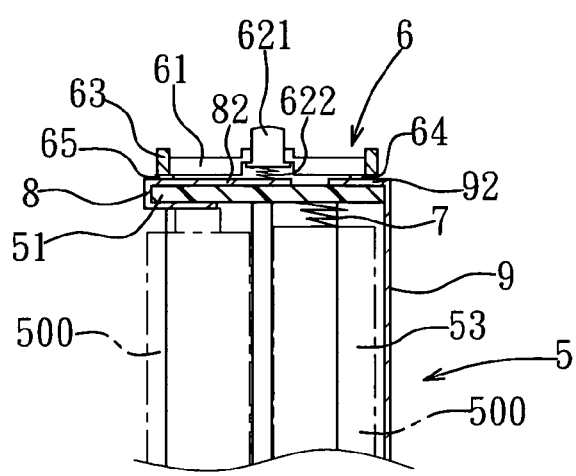
FIG. 8 is a fragmentary schematic partly sectional view to illustrate the preferred embodiment in an assembled state.

When the interface assembly 6 is disposed on the top wall 51 of the casing 5, as best shown in FIG. 8, the second end portion of the resilient terminal part 622 of the anode terminal 62 is in electrical contact with the second end portion 82 of the positive electrode 8, the second end portions of the contact elements 64 are in electrical contact with the second end portion 92 of the negative electrode 9, and the insulating protrusion 65 is sandwiched between the cathode terminal 63 of the interface assembly 6 and the second end portion 82 of the positive electrode 8. Accordingly, a gap is maintained between the cathode terminal 63 of the interface assembly 6 and the second end portion 82 of the positive electrode 8. As such, short-circuiting between the cathode terminal 63 of the interface assembly 6 and the positive electrode 8 can be prevented.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A battery receptacle, comprising:
    an insulative casing including top and bottom walls that cooperate to define an accommodating space therebetween for accommodating a battery unit;
    a positive electrode having a first end portion that extends into said accommodating space and that is adapted to contact electrically the battery unit, and a second end portion that is disposed externally of said accommodating space and that abuts against said top wall of said casing;
    a negative electrode having a first end portion that extends into said accommodating space and that is adapted to be connected electrically to the battery unit, and a second end portion that is disposed externally of said accommodating space and that abuts against said top wall of said casing; and
    an interface assembly disposed on said top wall of said casing, and including
        an insulative body having top and bottom surfaces, and a peripheral surface that interconnects said top and bottom surfaces,
        an anode terminal having a first end portion that extends through said insulative body and that projects from said top surface of said insulative body, and a second end portion that projects from said bottom surface of said insulative body and that is in electrical contact with said second end portion of said positive electrode,
        a cathode terminal provided on said peripheral surface of said insulative body,
        a contact element having a first end portion that extends through said insulative body and that is in electrical contact with said cathode terminal, and a second end portion that projects from said bottom surface of said insulative body and that is in electrical contact with said second end portion of said negative electrode, and
        an insulating protrusion provided on said bottom surface of said insulative body, and abutting against said second end portion of said positive electrode, thereby maintaining a gap between said cathode terminal and said second end portion of said positive electrode.

2. The battery receptacle as claimed in claim 1, wherein said insulative body is generally circular in shape.

3. The battery receptacle as claimed in claim 1, wherein said insulating protrusion is sandwiched between said cathode terminal of said interface assembly and said second end portion of said positive electrode.

4. The battery receptacle as claimed in claim 1, wherein said contact element is configured with bends.

5. The battery receptacle as claimed in claim 1, wherein said insulating protrusion is formed integrally with said insulative body.

6. The battery receptacle as claimed in claim 1, wherein said first and second end portions of said anode terminal of said interface assembly are in the form of a cap-shaped terminal part and a resilient terminal part, respectively.

7. The battery receptacle as claimed in claim 1, wherein said positive electrode is generally U-shaped, and includes
    a first arm that serves as said first end portion of said positive electrode, that abuts against said top wall of said casing, and that is adapted to contact electrically a positive terminal of the battery unit,
    a second arm that serves as said second end portion of said positive electrode, that abuts against said top wall of said casing, and that is in electrical contact with said anode terminal, and
    a third arm that interconnects said first and second arms and that abuts against a periphery of said top wall of said casing.

8. The battery receptacle as claimed in claim 1, further comprising an electrical contact disposed on said bottom wall of said casing, connected electrically to said first end portion of said negative electrode, and adapted to contact electrically a negative terminal of the battery unit.

9. The battery receptacle as claimed in claim 1, wherein said top wall of said casing is formed with a pair of holes therethrough, said battery receptacle further comprising a pair of electrical contacts that are connected in series, each of said electrical contacts having a first end portion that extends into said accommodating space through a respective one of said holes, and a second end portion that is disposed in the respective one of said holes.

10. The battery receptacle as claimed in claim 9, wherein said top wall of said casing is formed with a groove that interconnects said holes in said top wall of said casing, said battery receptacle further comprising a conductive strip that is disposed in said groove in said top wall of said casing and that interconnects said electrical contacts.

11. The battery receptacle as claimed in claim 1, wherein said casing further includes a lateral wall that interconnects said top and bottom walls, said negative electrode further having an intermediate portion that interconnects said first and second end portions of said negative electrode and that abuts against said lateral wall of said casing, said first end portion of said negative electrode extending into said accommodating space through said lateral wall of said casing.

12. The battery receptacle as claimed in claim 11, wherein said lateral wall of said casing is formed with a groove, said intermediate portion of said negative electrode being disposed in said groove.

13. The battery receptacle as claimed in claim 1, wherein said top wall of said casing is formed with a groove, said second end portion of said positive electrode being disposed in said groove.

14. The battery receptacle as claimed in claim 1, wherein said top wall of said casing is formed with a groove, said second end portion of said negative electrode being disposed in said groove.

* * * * *